April 21, 1970  W. R. CALVERT ET AL  3,507,051
REGENERATION PROCESS
Filed Feb. 26, 1968  2 Sheets-Sheet 1
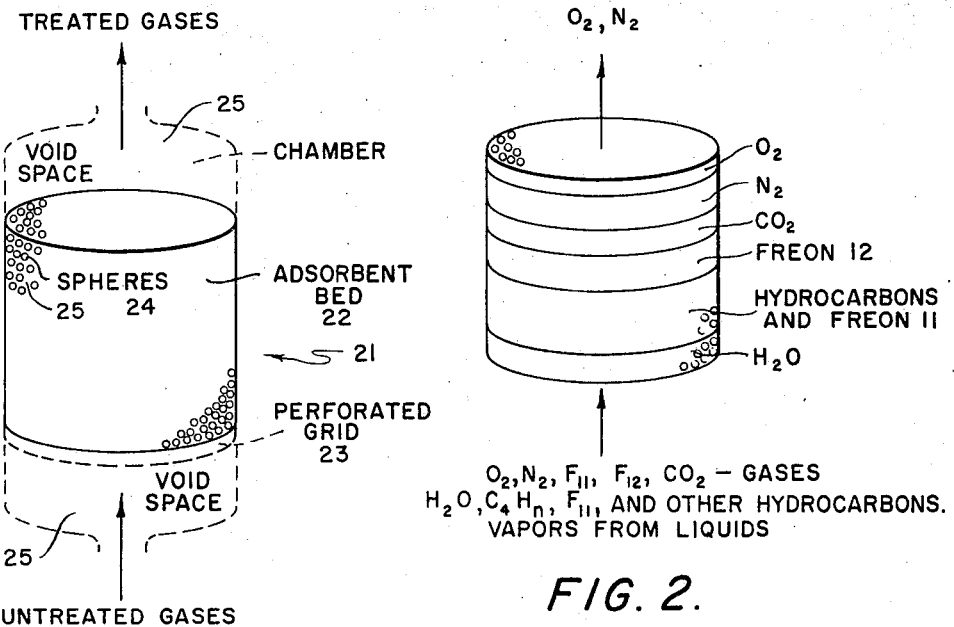
FIG. 1.
FIG. 2.
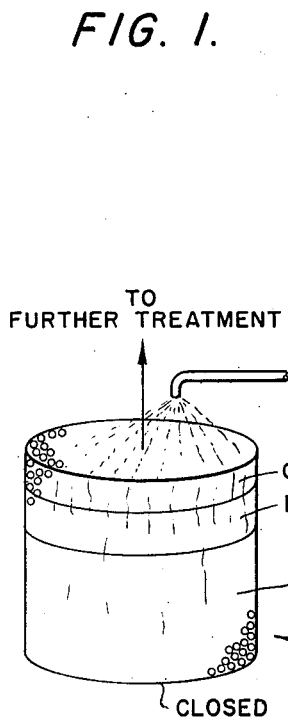
FIG. 3.
FIG. 4.
INVENTORS
WILLARD R. CALVERT
JAMES N. LITTLE
BY
ATTORNEYS

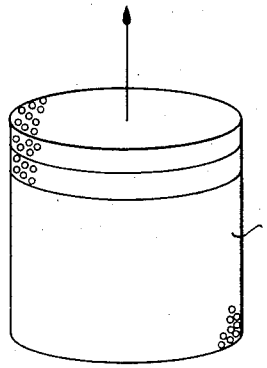
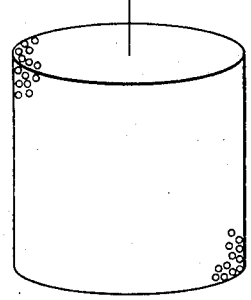

United States Patent Office 3,507,051
Patented Apr. 21, 1970

3,507,051
REGENERATION PROCESS
Willard R. Calvert, 809 Teakwood Drive, Severna Park, Md. 21146, and James N. Little, 1022 Park Ave., Annapolis, Md. 21403
Filed Feb. 26, 1968, Ser. No. 708,359
Int. Cl. F26b 3/06
U.S. Cl. 34—9          5 Claims

ABSTRACT OF THE DISCLOSURE

A process for regenerating an adsorbent of the type used in purifying contaminated air in an enclosed environment. The process uses an aqueous solution to prevent degradation of the adsorbent material during regeneration.

---

The invention described herein may be manufactured and used by or for the Government of the United States of America for governmental purposes without the payment of any royalties thereon or therefor.

BACKGROUND OF THE INVENTION

The present invention relates generally to an adsorption process for purifying contaminated air and more particularly to the process of regenerating an adsorbent with an aqueous solution.

Air purification is important in maintaining the enclosed and independent atmosphere of submarines, wherein air is reused through an indefinite time. Various off gases from men, materials and machines must be separated and removed to the sea.

It is also important, in the separation process, to conserve the desired gases $O_2$ and $N_2$ since losses due to processing must be replaced from storage. Gas separations can be precisely controlled if the adsorption variables are understood and if the processes are designed for accurate control. Failure to understand the effects that variables have on the adsorption process has limited the objectives in prior art adsorption systems. Some prior art systems have been designed on the assumption that the removal of $CO_2$ from breathing air necessarily requires that moisture be removed first, to allow a maximum capacity for the $CO_2$ adsorption and removal to purify the air. As a disadvantage in prior art systems the benefits of water as moisture in air and otherwise have not been fully comprehended.

SUMMARY

The general purpose of this invention is to provide a process that has all the advantages of similarly employed prior art processes and has none of the above-described disadvantages. To attain this, the present invention utilizes the benefits provided by the moisture entrained with the gases to be purified and the further benefits provided by the addition of measured amounts of water to the adsorbent during desorption. Addition of an organic base to the water to form a 0.1% aqueous solution also prevents permanent damage to the adsorbent during heating. The process of this invention may be applied to an adsorbent bed. The adsorbent bed is contained within a housing formed from a suitable structural material. The addition of water to supplement the amount adsorbed diminishes the decomposition of certain adsorbates which normally occurs at desorption and permits the separation of minor quantities of desired gases, e.g. $O_2$ and $N_2$ from the undesired contaminations, e.g. $CO_2$, hydrocarbons, refrigerant gases, etc. Furthermore, gases liberated by the addition of water are primarily the gases which occupied void spaces and those which were lightly held by the adsorbent. The adsorbed and added water become steam during subsequent heating, thus sweeping adsorbates away from the adsorbent and carrying them into a receiving condenser for subsequent disposal.

An object of the present invention is to provide a selective adsorption process of improved efficiency and simplicity.

Another object is to provide a process for use in controlling the gaseous environment within enclosed areas to make them suitable for habitation.

A further object of the invention is to utilize an aqueous solution in a process for regeneration of an adsorbent.

Still another object is to provide a process for recycling an adsorbent which will extend its useful life.

BRIEF DESCRIPTION OF THE DRAWINGS

The exact nature of this invention, as well as other objects and advantages thereof, will be readily apparent from consideration of the following specification related to the annexed drawings in which:

FIGS. 1–6 show the process of the invention.

FIG. 7 shows exemplary apparatus for practicing the process of the invention.

DESCRIPTION OF THE PREFERRED EMBODIMENT

As shown in FIG. 1, reference numeral 21 designates an adsorber unit being operated to remove contaminants from a mixture of gases. It is preferred that the adsorber unit which is used in this invention is similar in principle to that shown in FIG. 7.

The adsorbent bed 22 is contained within a housing formed from a suitable structural material. The nature and particle size of the adsorbent materials will be later described in greater detail. The adsorber unit 21 is provided with internal adsorbent support perforated grid 23, as used in devices employing solid adsorbents.

The adsorber unit 21 has conduits for introducing purge gas and feed gas into the adsorbent bed 22 and for discharging effluent and adsorbates laden steam from the adsorbent bed 22. One class of solid adsorbents which may be re-cycled by the process of this invention is generally referred to as molecular sieves. These materials are naturally occurring and synthetic zeolites which contain a large number of small cavities interconnected with pores of uniform size. One particularly effective material for the purpose of this invention is designated as MS544, a sodium alluminosilicate adsorbent, a product of W. R. Grace and Co., Davison Chemical Division, Baltimore, Md.

FIGS. 1–6 show the flow diagram of the process of the invention. Although the details of the adsorption system shown in FIG. 7 are not part of the invention, they are included to illustrate schematically the steps of the process and a method which may be used to analyze the results of the process. It will be appreciated that the process of this invention may be modified by changing the temperatures, pressures, type of adsorbents employed and flow rates of the gases to be treated.

In the following example, contaminated air was prepared, then compressed, cooled, filtered (with condensate drain-off) and passed through MS544 adsorbent at 30 p.s.i.g. and temperatures as shown below. The condensate drain-off which follows the cooling of the compressed air includes air-carried particulate materials separated by the same filter which separated the condensates. This drain-off is transferable to waste disposal. Other fine particulates not separated by the filter are further filtered and entrapped by the adsorbent bed 22. Gases and vapors ($O_2$, $N_2$, $CO_2$, hydrocarbons) and moisture are also entrapped by the adsorbent. Two halogenated hydrocarbons, Freon 11 and Freon 12, are included to confirm regenerative disposable removal by adsorption treatment of air. Effluent from the adsorbent bed 22 is analyzed to show changes in concentrations. Adsorbents are studied in the adsorption apparatus at 30 p.s.i.g. at room temperature. With all of the components in the feed stream, adsorption is contained until there is no further separation of contaminants by the adsorbent. Desorption and activation are then necessary before further separation can be continued.

FIG. 1 shows a three-dimensional assembly of spherical particles 24 and void spaces 25 comprising the adsorbent bed 22. Upon completion of the adsorption cycle, the adsorber unit 21 is closed, thus retaining wanted and unwanted gases in the void spaces 25 between the spherical particles 24 and above and below the adsorbent bed 22. The amount of retained wanted gases is significant since any loss must be replaced from storage.

FIG. 2 shows the theoretical distribution of the adsorbed gases and vapors which may be theorized as a series of zones through the height of the adsorbent bed. Vapors, condensing or otherwise existing as liquids coating adsorbent particles, will migrate reluctantly, if at all, while mobile gases and some vapors migrate upward through the bed. Thus, water and liquid hydrocarbons are in lower zones and the gases $CO_2$, Freon 12, $N_2$ and $O_2$ are in their respective uppermost zones. Actually a sharp interface, as shown in FIG. 3, is not needed between the zones and the arrangement of zones as shown is used to show sequence rather than discrete quantities. At the time when unwanted $CO_2$ begins to appear in the effluent treated gases, the adsorbent bed may be holding within itself gaseous volumes 25 times larger than the bed volume. This volume includes a certain amount of $O_2$ and $N_2$ which are wanted gases. For example, a 350 cc. adsorption bed yields a total volume of gaseous materials, after desorption, as great as 9000 cc., which includes 4000 cc. of $O_2$ plus $N_2$.

As shown in FIG. 3, to conserve wanted gas, cold water is measured into the top of the adsorbent bed 22 to wet the zones containing the $O_2$ and $N_2$, thus displacing these gases. A certain amount of water will unavoidably flow downward thus causing small amounts of unwanted gases to be included. As these gases are evolved they are permitted to flow outward through valve 27 to further treatment, which removes the included unwanted gases.

In FIG. 4, hot water is measured into the adsorbent bed 22 to cause more of the unwanted gases to evolve and flow outward to waste disposal.

The addition of water to the adsorbent bed 22 causes certain low boiling point adsorbates to be desorbed from the adsorbent. The addition of water results in a sharp increase in the temperature of the adsorbent, however, this increase is limited by the quenching effect of the water to 212° F. This increase in temperature is caused by the heat of adsorption. Further heating of the now wet adsorbent converts the water to steam and the steam displaces the gases sweeping them out of the apparatus.

Although limiting the temperature during desorption minimizes the damage from decomposition of the halogenated hydrocarbons (Freon 11 and Freon 12), there is degradation of the adsorbent material caused by the unstable Freons. The extent of damage to the adsorbent material is reflected in the decrease in the liters of wastes ($CO_2$ and Freon) removed during each cycle of the regenerable gas separations process or adsorbent process.

Damage to the adsorbent material may be further reduced by using a 0.1% aqueous solution of an organic amine such as monoethonolamine (MEA) rather than pure water. The small amount of the organic base (MEA) provides hydroxyl (OH) site protection to the adsorbent, preventing the damaging effects which would otherwise become permanent during subsequent heating of the adsorbent. The desorption cycles where temperatures over 300° F. are used, damage to the adsorbent is again detected, notwithstanding the fact that the amine treatment to protect (OH) sites had been used. Use of larger quantities of the amine or use of an amine with a higher boiling point may supplement the improvement into higher temperatures.

| | Boiling Point (°F.) | Formula | Molecular weight |
|---|---|---|---|
| Monoethonolamine (MEA) | 339 | $HOCH_2CH_2NH_2$ | 61.08 |
| Diethonolamine (DEA) | 514 | $(HOCH_2CH_2)_2NH$ | 105.14 |
| Triethonolamine (TEA) | 532 | $(HOCH_2CH_2)_3N$ | 149.19 |

In this invention the function of the (MEA) is to protect the dry solids adsorbents' capacity for adsorption. Since the (MEA) evaporates at 212° F., and subsequent heat activation in air elevates the adsorbent to a temperature of about 620° F. removal of the amine is assured. Thus the amine is not present with the adsorbent during adsorption of contaminants from the air. An organic base is used for the purpose described since it leaves no residue on the adsorbent. An inorganic base would leave an inhibiting residue.

FIG. 5 shows the step of applying steam and heat to heat the adsorbent bed 22 and to carry the unwanted gases and vapors to waste disposal. During this step the previously injected water governs the rate of heating, thus minimizing the decomposition of halogenated hydrocarbons such as Freons. Without this minimization the adsorbent bed 22 may be unduly changed and inhibited by the products of decomposition, thus shortening its useful life.

Following the sweep-out of wastes, steam is replaced by clean air as shown in FIG. 6. The heating continues until all traces of free-water and water from crystal hydrates are carried away. Further treatment of this effluent may include catalytic oxidation of non-adsorbed gases such as hydrogen, carbon monoxide, and hydrocarbons containing less than four carbon atoms per molecule. The effluent gases (hot) may then exchange heat to incoming gases. Further conditioning of the effluent may include cooling and humidification as desired.

EXAMPLE

In an example to determine the benefits of additions of aqueous solution (200 ml. of 0.1% MEA per pound of adsorbent) desorption step in the process of the invention, apparatus of the type shown in FIG. 7 may be used. During adsorption, conduit 28 carries contaminated air to the void 25 beneath the perforated grid 23 which supports the weight of the adsorbent bed 22 while distributing the contaminated air uniformly over the cross sectional area of the bottom of the adsorbent bed 22.

As the contaminated air flows upwardly through active adsorbent bed 22, $O_2$ and $N_2$ are separated from $CO_2$, moisture, and the air contaminants which may be present. Gases which precede $CO_2$ in chromatographic sequence emerge from the adsorbent bed 22 while contaminants and moisture are retained. In collecting the data which follows, adsorption was terminated when 0.12% $CO_2$ appeared in the effluent. The adsorbent is then loaded with adsorbates.

Chamber Data

Adsorbent: 13× aluminosilicates MS544, 0.085 inch diameter spheres.
Adsorption: At 30 p.s.i.g. and 45° F.
Adsorbent bed: 0.50 lb., or 21.7 cubic inch; 4.8 inch depth; 4.51 sq. in. cross sectional area.
Flow rate: 1.0 c.f.m. of effluent.
Gas analysis: Feed and effluent by nondispersive infrared and gas/liquid chromatography. Desorbates by gas/solid and gas/liquid chromatography. Volume of desorbates was measured as collected over acidic brine in a liquid displacement collector. Temperature was recorded from a CA thermocouple located at the top of the adsorbent bed.

Desorption: While adding 0.1% MEA aqueous solution slowly (100 cc.) to desorb the adsorbate laden bed, a first desorbate fracture is collected. By heating externally with steam, a second desorbate fraction is collected.

Activation: At 620° F. with 1 c.f.m. clean air purge.

Steam supply: 30 p.s.i.g. steam from a generator at 25 cc./min. condensate rate to 400 cc. condensate per lb. absorbent.

In the example to show the benefits from the addition of water to stabilize temperatures at 212° F., a first program of tests with $CO_2$ as the only contaminant and a second program of tests with the halogenated hydrocarbons, Freon 11 included, were conducted.

TABLE I

Program 1: Stabilized at 212° F. by water; Cycle No., Bed capacity—Liters of $CO_2$ adsorbed/desorbed

| Contaminants used | 1.2% $CO_2$ | | 1.2% $CO_2$+Freon | |
|---|---|---|---|---|
|  | * | $\Delta CO_2$ |  |  |
| 1 | 5.7 | High |  |  |
| 2 | 5.4 | −.3 |  |  |
| 3 | 4.7 | −1.0 |  |  |
| 4 |  |  | 5.3 | −.4 |
| 5 |  |  | 4.9 | −.8 |
| 6 |  |  | 4.7 | −1.0 |

Program 2: Not stabilized at 212° F. by water; Freon 11 decomposition temperature exceeds 300° F.

| 7 |  |  | 5.1 | −.6 |
|---|---|---|---|---|
| 8 |  |  | 3.4 | −2.3 |
| 9 |  |  | 4.0 | −1.7 |
| 10 |  |  | 3.2 | −2.5 |
| 11 |  |  | 2.8 | −2.9 |
| 12 |  |  | 2.8 | −2.9 |

*$\Delta CO_2$—change related to High.

The data in Table I shows that the capacity of the adsorbent normally declines slightly during the first several cycles of adsorption and desorption and the normal variation of capacity of 0.5 lb. MS544 lies between 5.7 and 4.7 liters of $CO_2$ adsorbed and desorbed per cycle, when the desorption is controlled and stabilized by the addition of the aqueous solution to 212° F. and lower temperatures.

Further protection of the adsorbent was provided by substituting an aqueous solution of an amine (200 ml. of 0.1% by volume monoethanolamine per pound of MS544 adsorbent) for the water in the cold water step of this invention. Low pressure (20 p.s.i.g.) steam was then fed through the adsorbent bed. Subsequent input of heat boiled off the aqueous, amine solution which traveled with the desorbates, carried by steam, to waste disposal. Upon essentially complete transfer of these steam carried wastes out of the desorption chamber, the steam flow was replaced by a purge flow of clean air while heating was continued. After the adsorbent had been heated to about 600° F. it was active again. When cooled to around 33° F. to 80° F. the adsorbent was ready for the next adsorption cycle.

Table I also shows that the capacity of the adsorbent declines further when the temperature during desorption is not stabilized at 212° F. When heating is rapid and temperature is elevated to greater than 300° F. which will occur with only a small amount of water present (such as adsorbed humidity), the Freon 11 adsorbed and residing on the adsorbent, is also subjected to this elevated temperature. This temperature is sufficient to cause decomposition to acidic products from this halogenated hydrocarbon. In turn, the acidic products attack the adsorbent's (OH) sites, thereby degrading the adsorbent. Thus the combination of stabilized temperature (aqueous) and restoring of (OH) sites by the organic base, results in prevention of adsorbent degradation.

TABLE II

| Cycle No. | Amine | Aqueous desorption (milliliters) | | | | |
|---|---|---|---|---|---|---|
|  |  | $O_2$ | $N_2$ | $CO_2$ | Freon 11 | Total |
| 1 | (MEA) | 312 | 1,420 | 63 | Trace* | 1,795 |
| 2 |  | 336 | 1,580 | 60 | Trace | 2,006 |
| 3 |  | 302 | 1,420 | 65 | Trace | 1,787 |
| 12 | (TEA) | 327 | 1,460 | 73 | Trace | 1,860 |
| 13 |  | 326 | 1,504 | 116 | Trace | 1,946 |
| 14 |  | 334 | 1,524 | 100 | Trace | 1,958 |
|  |  | Heat desorption (milliliters) | | | | |
| 1 | (MEA) | 132 | 1,310 | 5,140 | 79 | 6,661 |
| 2 |  | 157 | 1,240 | 4,150 | 133 | 5,680 |
| 3 |  | 139 | 1,210 | 4,340 | 151 | 5,840 |
| 12 | (TEA) | 157 | 1,280 | 4,320 | 174 | 5,931 |
| 13 |  | 197 | 1,495 | 4,290 | 176 | 5,988 |
| 14 |  | 177 | 1,340 | 4,170 | 183 | 5,870 |

*Unmeasurable trace.

The data of Table II shows the benefits from the further protection by the amines in continuation of the data of Table I. The tests were conducted on a fresh batch of 0.5 lb. of MS544, thermally stabilized by aqueous, 0.1% (vol.) amine solution during aqueous desorption; after adsorption purification of a feed stream containing air, 1.2% $CO_2$ and 400 p.p.m. Freon 11, through 14 cycles.

Comparison of the $O_2$ and $N_2$ data reveals that major amounts of these wanted gases were recovered by the recycling of the gases from the aqueous desorption. Major amounts of $CO_2$ and Freon 11 were retained for waste disposal in the heat desorption fraction of desorbates. Through 14 cycles there was no sharp decline of $CO_2$ adsorbing capacity.

As shown by the above data, the process of this invention, when used for re-cycling an adsorption bed, will extend the useful life of the bed. Furthermore, the process preserves the desired gases such as $O_2$ and $N_2$, thus reducing waste and saving valuable storage space.

Obviously many modifications and variations of the present invention are possible in the light of the above teachings. It is therefore to be understood that, within the scope of the appended claims, the invention may be practiced otherwise than as specifically described.

What is claimed is:

1. A process for regenerating an adsorbent bed, comprising the steps of:
   measuring cold water into the adsorbent bed and passing gases displaced from said adsorbent bed through a conduit to further treatment or waste disposal;
   heating the water in the adsorbent bed thereby causing unwanted gases to evolve from said adsorbent bed and thereby causing the passing of the evolved gases through a conduit to waste disposal;
   purging the adsorbent bed with steam and passing the gases evolved thereby through a conduit to waste disposal;
   activating the adsorbent bed by passing air through the adsorbent bed until all liquids and gases are removed and the adsorbent bed is fully activated; and
   cooling the adsorbent bed after the step of activation thereby preparing the adsorbent chamber for a new adsorbent cycle.

2. A process for regenerating a degradable adsorbent bed by displacing wanted gases such as oxygen and nitrogen which have been entrapped within the adsorbent bed comprising the steps of:
   measuring into the adsorbent bed a solution consisting essentially of water and containing an organic amine; and
   removing said solution.

3. The process of claim 2 wherein the organic amine is selected from the group consisting of monoethonolamine, diethonolamine, and triethonolamine.

4. The process of claim 2 wherein said solution consists essentially of about 50 to 300 ml. of 0.1%, by volume, amine per pound of Molecular Sieve 544 adsorbent.

5. A process for regenerating an adsorbent bed employed in a system for removing, from a gaseous mixture, off gases from the living occupants and from machinery and materials in a closed compartment comprising the steps of:
- adding a measured amount of about a 0.1% aqueous solution of an organic amine thereby displacing $O_2$ and $N_2$ stored within void spaces between the particles comprising the adsorbent bed and the passing of the evolved gases through a conduit to further treatment;
- adding a measured amount of water into the adsorbent bed thereby causing the adsorbates to evolve and to be passed to waste disposal;
- purging the adsorbent bed with steam, thereby removing desorbates through a conduit to waste disposal;
- activating the adsorbent bed by passing air through the bed and simultaneously heating the bed, thereby removing free-water and water from crystal hydrates; and
- cooling the adsorption bed to ambient temperature before starting a new adsorption cycle.

References Cited

UNITED STATES PATENTS

| Number | Date | Name | Class |
|---|---|---|---|
| 1,758,398 | 5/1930 | Hasche | 55—27 |
| 1,948,779 | 2/1934 | Abbott et al. | 55—31 |
| 2,518,409 | 8/1950 | Williamson | 34—13 XR |
| 2,739,670 | 3/1956 | Miller | 55—31 |
| 2,764,252 | 9/1956 | Berg | 55—20 |
| 2,799,362 | 7/1957 | Miller | 55—31 |
| 3,221,477 | 12/1965 | Arnoldi et al. | 55—31 |
| 3,225,516 | 12/1965 | Smith et al. | 55—25 |
| 3,342,651 | 3/1966 | Arnoldi | 55—179 |
| 3,244,228 | 4/1966 | Parrish | 166—9 |
| 3,280,536 | 10/1966 | Berlin | 55—58 |

FREDERICK L. MATTESON, JR., Primary Examiner

H. B. RAMEY, Assistant Examiner

U.S. Cl. X.R.

55—59